(12) United States Patent
Lee

(10) Patent No.: US 7,867,367 B2
(45) Date of Patent: Jan. 11, 2011

(54) FLUID TREATMENT APPARATUS

(76) Inventor: Sang Jin Lee, 505-1206 Jugong Apt., Jamsil-Dong Songpa-Gu, 138-220 Seoul (KR)

( * ) Notice: Subject to any disclaimer, the term of this patent is extended or adjusted under 35 U.S.C. 154(b) by 1174 days.

(21) Appl. No.: 11/509,683

(22) Filed: Aug. 25, 2006

(65) Prior Publication Data
US 2007/0048199 A1 Mar. 1, 2007

(30) Foreign Application Priority Data
Aug. 31, 2005 (KR) .............. 10-2005-0080456

(51) Int. Cl.
C25B 9/00 (2006.01)
C02F 1/461 (2006.01)

(52) U.S. Cl. ............... 204/248; 204/278.5; 210/748.18; 205/745

(58) Field of Classification Search ............. 204/278.5, 204/248; 205/745; 210/748.18
See application file for complete search history.

(56) References Cited

U.S. PATENT DOCUMENTS

| 577,134 | A | * | 2/1897 | Harrison | 204/248 |
| 3,340,175 | A | * | 9/1967 | Mehl | 204/268 |
| 3,728,245 | A | * | 4/1973 | Preis et al. | 204/278.5 |
| 3,933,606 | A | * | 1/1976 | Harms | 205/743 |
| 4,392,937 | A | * | 7/1983 | Schmitt et al. | 204/269 |
| 4,710,282 | A | * | 12/1987 | Chak et al. | 204/228.2 |
| 4,902,391 | A | * | 2/1990 | Ibbott | 205/745 |
| 4,931,166 | A | * | 6/1990 | Ramshaw | 204/212 |
| 5,258,108 | A | * | 11/1993 | Cassidy | 205/745 |
| 5,302,273 | A | * | 4/1994 | Kemmerer | 204/272 |
| 5,326,439 | A | * | 7/1994 | Brewster | 205/761 |
| 5,368,705 | A | * | 11/1994 | Cassidy | 204/248 |
| 5,387,324 | A | * | 2/1995 | Ibbott | 205/745 |
| 5,980,727 | A | * | 11/1999 | Putz et al. | 205/688 |
| 6,045,707 | A | * | 4/2000 | Scrudato et al. | 210/748.18 |
| 6,264,837 | B1 | * | 7/2001 | Marsden | 210/199 |
| 6,267,883 | B1 | * | 7/2001 | Weaver et al. | 210/198.1 |
| 6,605,212 | B2 | * | 8/2003 | Marsden | 210/167.21 |
| 6,663,766 | B1 | * | 12/2003 | Adin et al. | 205/742 |

FOREIGN PATENT DOCUMENTS

FR 2832703 A1 * 5/2003

* cited by examiner

Primary Examiner—Harry D Wilkins, III
(74) Attorney, Agent, or Firm—Dykema Gossett PLLC

(57) ABSTRACT

A fluid treatment apparatus capable of maximizing contact area between a fluid and electrodes in the apparatus to improve corrosion resistance or combustion efficiency includes a housing having an inlet port and an outlet port for the water at both ends of the housing, and a plurality of first electrodes installed in the housing for generating a potential difference through delivery of electrons at a contact surface between the fluid and the electrodes. The first electrodes are disc shaped and have a water passing hole formed in a center portion. The first electrodes being arranged in parallel in a direction perpendicular to a main flow direction of the fluid, so as to form a channel between the first electrodes to branch and guide a main flow.

10 Claims, 2 Drawing Sheets

FLUID TREATMENT APPARATUS

BACKGROUND OF THE INVENTION

1. Field of the Invention

The present invention relates to a fluid treatment apparatus capable of reducing the forward reaction rate of water or fuel in a fluid pipeline with use of the electromotive force of a metal, and more particularly to a fluid treatment apparatus capable of maximizing a contact area between a fluid and an electrode in the apparatus to improve a performance such as corrosion resistance and combustion efficiency.

2. Background of the Related Art

In general, fluid treatment apparatuses that reduce a fluid in a fluid pipeline to resist the corrosion of the pipeline or combustion efficiency of a fuel have been developed. Among the apparatuses, various devices employing so-called sacrificial anode method with use of a potential difference between a metal and a fluid (e.g., water or moisture contained in fuel) have been proposed.

Such a fluid treatment apparatus can increase an amount of hydrogen in the fuel by converting water into alkali ion water or applying reduction potential to the moisture contained in the fuel, as well as preventing the surface of the pipeline from being oxidized or scale from being formed on the surface, thereby forming a mixture of hydrogen and fuel and thus improving a combustion efficiency However, the fluid treatment apparatus is a simple structure to reduce a forward reaction rate with use of the electromotive force of a metal itself or a coated metal. Since the conventional lacks a means for smoothly guiding flow of other fluid or a means for increasing a contact area, the apparatus is not enough to obtain the resistance to the corrosion or the improvement of fuel efficiency.

SUMMARY OF THE INVENTION

Accordingly, the present invention is directed to a fluid treatment apparatus that substantially obviates one or more problems due to limitations and disadvantages of the related art.

An object of the present invention is to provide a fluid treatment apparatus including a disc-shaped electrodes made of metal generating an electromotive force of negative potential in a contacting course of fluid and a fluid pipeline and arranged in parallel in a direction perpendicular to a main flow direction of the fluid, thereby increasing a contact area between the electrodes and the fluid and thus preventing corrosion or the formation of scale and maximizing a combustion efficiency.

To achieve the object and other advantages, according to one aspect of the present invention, there is provided a fluid treatment apparatus, in which when a fluid passes through an electrode made of a metal having an electromotive force, a forward reaction rate of water or fuel is reduced by reduction potential using a potential difference generated in a contacting course of the electrode and the fluid, the fluid treatment apparatus comprising: a housing having an inlet port and an outlet port for the water at both ends of the housing; and at least one first electrode installed in the housing for generating a potential difference through delivery of electrons at a contact surface between the fluid and the electrode, in which the first electrode is formed in a disc shape, and has a water passing hole formed in a center portion of the first electrode, and in which the first electrodes are arranged in parallel in a direction perpendicular to a main flow direction of the fluid, so as to form a channel between the first electrodes to branch and guide a main flow; in which the main flow is branched by the channels formed between the first disc-shaped electrodes arranged in parallel, and the branched flow is collected at the water passing hole and then is discharged from the outlet port.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

A preferred embodiment according to the present invention will now be explained with reference to the accompanying drawings.

Figure 1:
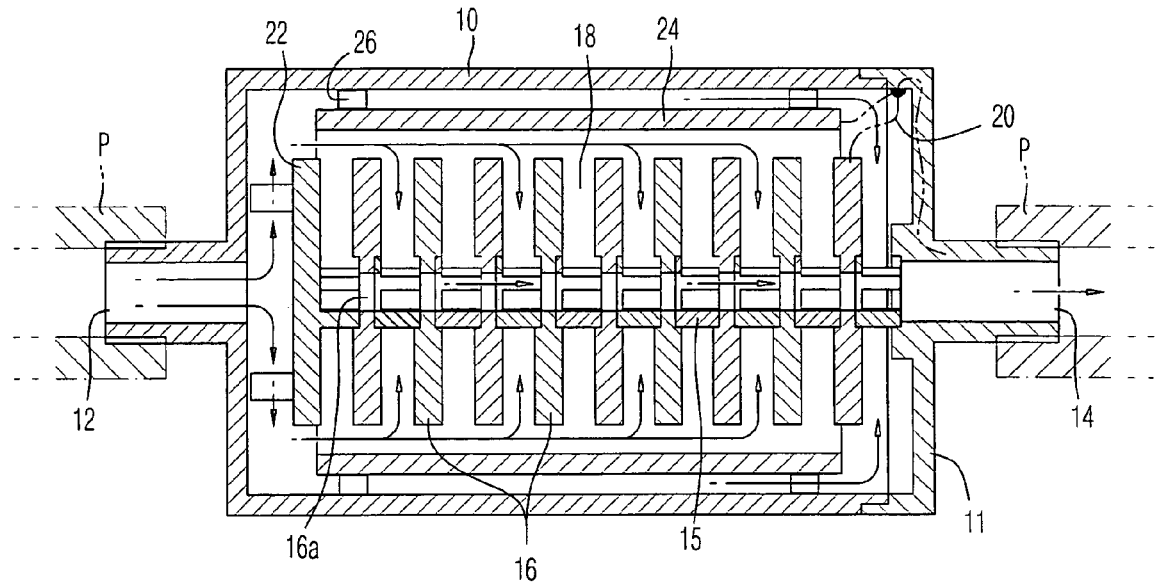
FIG. 1 is a cross-sectional view illustrating the general construction of a fluid treatment apparatus according to an embodiment of the present invention.

FIG. 1 shows a fluid treatment apparatus according to the present invention in detail. The fluid treatment apparatus is installed in a fluid pipeline for feeding water or fuel for the purpose of converting the water into alkali ion water and generating hydrogen in the fuel, as well as preventing the corrosion of the inner wall of a pipe or the formation of scale on the inner wall, which can improve combustion efficiency. More particularly, the fluid treatment apparatus passes the fluid through an electrode made of a metal having an electromotive force and applies reduction potential, which is based on a potential difference generated at the contact portion between the fluid and the electrode, to the fluid, thereby reducing the forward reaction rate of various fluids such as water or fuel.

The fluid treatment apparatus is installed at a proper position of the pipe, through which the water or fuel passes, preferably, at an inlet or in front of interruption devices additionally installed to control flow of the fluid, and, if a filter is installed, behind the filter.

The fluid treatment apparatus includes a housing 10 enclosing a body to form a closed space. The housing 10 is provided with an inlet port 12 and an outlet port 14 which are connected to both longitudinal ends of the pipe P, so that the fluid to be treated comes into or out from the apparatus.

The material of the housing 10 is selected depending upon the purpose of treatment. Specifically, the housing may be made of a conductor when it resists the corrosion or improves the combustion efficiency, or may be made of nonconductor when alkali ion water is generated.

Further, the housing 10 includes a cover 11 threadedly engaged to one side of the housing so as to assembly or disassembly components described hereinafter.

The fluid treatment apparatus also includes, in the housing 10, at least one first electrode 16 for generating a potential difference through delivery of electrons at the contact surface between the fluid and the electrode. The first electrode 16 is formed in a disc shape having a desired thickness, and has a water passing hole 16a formed in the center portion of the first electrode 16.

Further, the fluid treatment apparatus includes channels 18, formed between the first electrodes which are spaced in parallel apart from each other in a direction perpendicular to the flow direction of the fluid in the housing 10, for branching and guiding the main flow.

A spacer 15 is installed so as to maintain a gap between the first electrodes 16 in a proper interval. The spacer 15 having a desired length is made of nonconductor, and a pair of female and male spacers 15 are conformally mounted on opposite surfaces of the first electrode 16, so as to maintain the gap of the channel 18. The spacer 15 is adapted not to interrupt the flow of the fluid. Also, the first electrodes 16 are installed in a coaxial align with the center portion of the housing 10 by the spacers 15.

The spacer 15 may be formed in the same material as that of the first electrode 16. In this instance, the lifespan of the first electrode 16 should be considered since the interval between the spacers 15 is varied depending upon the sacrifice of the first electrode.

Also, the first electrodes 16 are formed of a metal having an electromotive force. Preferably, the first electrodes 16 are formed of a metal of a high ionization degree (e.g., magnesium alloy, zinc alloy, or the like). Alternatively, the first electrodes made of the same material or heterogeneous materials may be alternatively arranged.

The main flow of the fluid is branched by the channels 18 formed between the first disc-shaped electrodes 16 arranged as described above in the direction indicated by arrows in FIG. 1. The branched flow is collected at the water passing hole 16a formed at the center portion of the first electrodes 16, and then are discharged from the outlet port 14. Accordingly, the flow of the fluid can increase the contact area between the fluid and the first electrodes 16, thereby improving its treating ability.

Further, the fluid treatment apparatus includes a flat-shaped distributor 22 positioned in front of the frontmost first electrode 16 for distributing the fluid coming in through the inlet port 12 toward the inlet, so that the fluid is smoothly supplied to the respective channels 18 formed between the first disc-shaped electrodes 16.

Also, the fluid treatment apparatus includes a second pipe-shaped electrode 24 interposed between the housing 10 and the first electrodes 16. The second electrode 24 is an additional element to improve its treating ability. In this instance, a spacer 26 is necessarily installed between the second electrode 24 and the housing 10 made of conductor so as to isolate them.

The first electrodes 16 are electrically connected to the housing 10 by means of a lead wire 20 to generate negative electricity on the pipe P, through which the fluid flows, connected to the outlet port 14. The lead wire 20 is used for cathodic protection or improvement of combustion efficiency.

Figure 2:
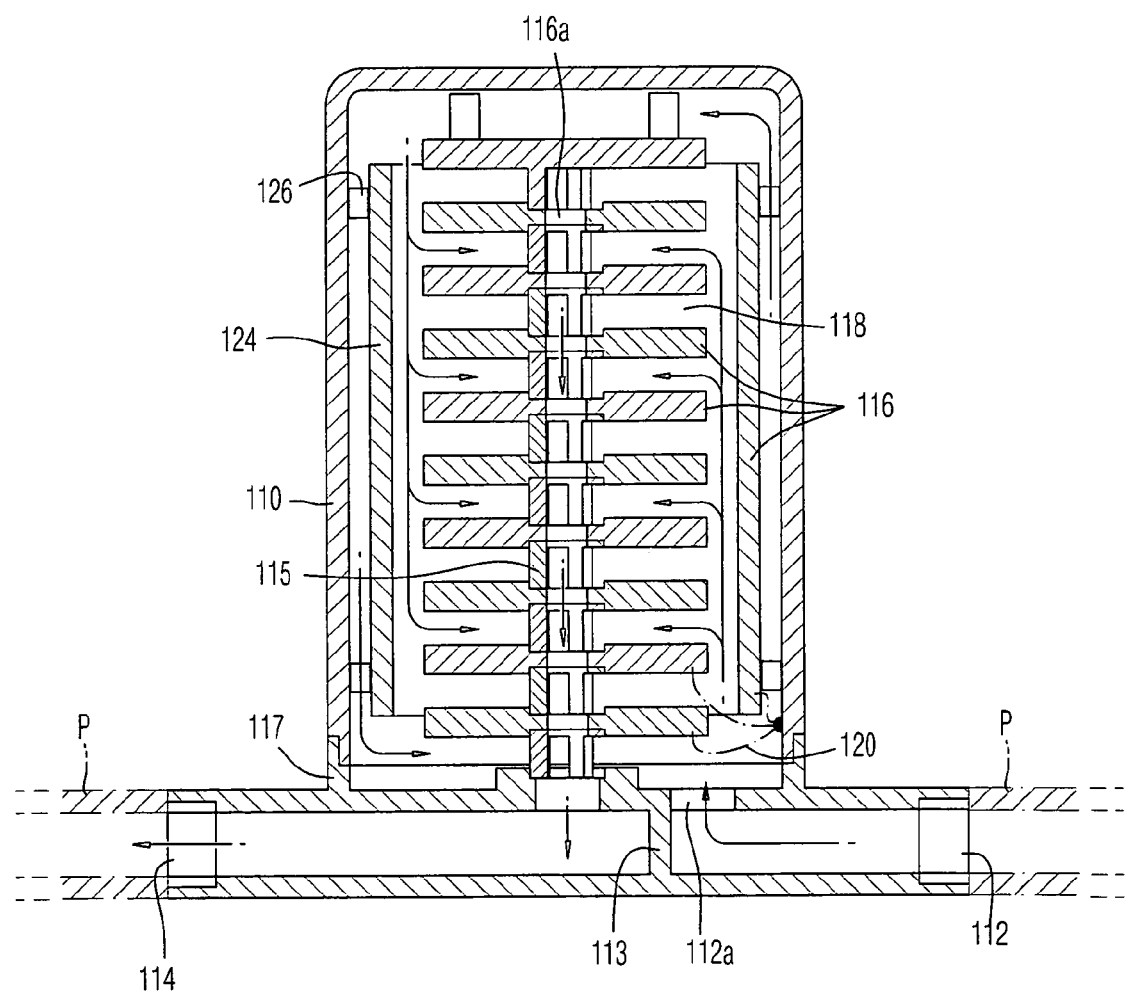
FIG. 2 is a cross-sectional view illustrating the construction of a fluid treatment apparatus according to another embodiment of the present invention.

FIG. 2 shows a fluid treatment apparatus according to another embodiment of the present invention. This embodiment is distinguishable from the above embodiment shown and described in FIG. 1 in that the main flow of fluid to be treated is bypassed. The apparatus is adapted to be conveniently repaired and maintained.

More specifically, the fluid treatment apparatus of this embodiment is installed at a proper position of a pipe P.

The fluid treatment apparatus includes a housing 110 enclosing a body to form a closed space and installed in a direction perpendicular to a main flow direction of the fluid.

The housing 110 is provided at the lower portion thereof with an inlet port 112 and an outlet port 114 which are connected to both longitudinal ends of the pipe P, so that the fluid to be treated comes into or out from the apparatus.

Also, the fluid treatment apparatus includes, at a proper position of the outlet port 112, a wall 113 for preventing the fluid coming in through the inlet port 112 from directly flowing toward the outlet port 114, and a passage 112a communicating with the housing 110 for bypassing the main flow of the fluid toward the housing 110.

The material of the housing 110 is selected depending upon the purpose of treatment. Specifically, the housing may be made of a conductor when it resists the corrosion or improves the combustion efficiency, or may be made of nonconductor when alkali ion water is generated. The housing 110 is formed in a cap shape, and is threadedly engaged to a base 117 integrally formed with the inlet port 112 and the outlet port 114.

If the housing 110 is formed in the cap shape, and is threadedly engaged to the base 117, components of the apparatus can be easily assembled or disassembled without disassembling the apparatus from the pipe P.

The fluid treatment apparatus also includes, in the housing 110, at least one first electrode 116 for generating a potential difference through delivery of electrons at the contact surface between the fluid and the electrode. The first electrode 116 is formed in a disc shape having a desired thickness, and has a water passing hole 116a formed in the center portion of the first electrode 116. Further, the fluid treatment apparatus includes channels 118, formed between the first electrodes which are spaced in parallel apart from each other in a direction perpendicular to the flow direction of the fluid in the housing 110, for branching and guiding the main flow.

A spacer 115 is installed so as to maintain a gap between the first electrodes 116 in a proper interval. The spacer 115 having a desired length is made of nonconductor, and a pair of female and male spacers 115 are conformally mounted on opposite surfaces of the first electrode 116, so as to maintain the gap of the channel 118. Also, the first electrodes 116 are installed in a coaxial align with the center portion of the housing 110 by the spacers 115.

The first electrodes 116 are formed in the metal having an electromotive force. Preferably, the first electrodes 116 are formed in a metal of a high ionization degree (e.g., magnesium alloy, zinc alloy, or the like). Alternatively, the first electrodes made of the same material or heterogeneous materials may be alternatively arranged.

The main flow of the fluid is branched by the channels 118 formed between the first disc-shaped electrodes 116 arranged in parallel as described above in the direction indicated by arrows in FIG. 2. The branched flow is collected at the water passing hole 116a formed at the center portion of the first electrodes 116, and then are discharged from the outlet port 114. Accordingly, the flow of the fluid can increase the contact area between the fluid and the first electrodes 116, thereby improving its treating ability.

Further, the fluid treatment apparatus includes a flat-shaped distributor 122 positioned in front of the frontmost first electrode 116 for distributing the fluid coming in through the inlet port 112 toward the inlet, so that the fluid is smoothly supplied to the respective channels 118 formed between the first disc-shaped electrodes 116.

Also, the fluid treatment apparatus includes a second pipe-shaped electrode 124 interposed between the housing 110 and the first electrodes 116. The second electrode 124 is an additional element to improve its treating ability. In this instance, a spacer 126 is necessarily installed between the second electrode 124 and the housing 110 made of conductor so as to isolate them.

The first electrodes 116 are electrically connected to the housing 110 by means of a lead wire 120 to generate negative electricity on the pipe P, through which the fluid flows, connected to the outlet port 114. The lead wire 120 is used for cathodic protection or improvement of combustion efficiency.

The operation of the fluid treatment apparatus will now be described in detail.

First, when the fluid treatment apparatus having the structure shown in FIG. 1 or 2 is mounted on the pipe of the fluid pipeline, the water or fuel passing through the inner space of the housing 10 or 110 comes in contact with the first electrodes 16 or 116.

In this instance, since the first electrodes 16 or 116 are made of a metal having Galvanic current lower than the pipe itself, a forward reaction rate is reduced if the first electrodes 16 or 116 come in contact with the water. Therefore, corrosion is prevented. When the first electrodes 16 or 116 come in contact with moisture contained in the fuel, an amount of hydrogen is increased, thereby forming a mixture of fuel and hydrogen and thus improving the combustion efficiency.

At that time, the potential difference generated at the first electrodes 16 or 116 is theoretically based on the Nernst Equation. For example, it is generally known that in case partial pressure of hydrogen is 1 bar and temperature is 25° C., metal-metal ion couple having up to −0.6 V deduces hydrogen ion at a sufficient rate when the metal comes in contact with the water.

Therefore, the potential of the metal is reduced by the electromotive force generated from the first electrodes 16 or 116 of the fluid treatment apparatus. Since the water is converted into the alkali ion water, it prevents the corrosion of the pipeline. Also, since the moisture contained in the fuel is reduced by electrolysis, the mixture of hydrogen and fuel is formed, thereby improving the combustion efficiency.

With the above description, according to the fluid treatment apparatus according to the present invention, since the electrodes of the apparatus are formed in a disc shape and are arranged in parallel in a direction perpendicular to a flow direction of the fluid, the contact area between the electrodes and the water is maximized, thereby expanding the lifespan of the apparatus and also reducing a cost required for its maintenance. Further, since the moisture contained in the fuel flowing through the apparatus is reduced to form a mixture of hydrogen and fuel. Therefore, the combustion efficiency is maximized, and thus soot and smoke are reduced.

The forgoing embodiments are merely exemplary and are not to be construed as limiting the present invention. The present teachings can be readily applied to other types of apparatus. The description of the present invention is intended to be illustrative, and not to limit the scope of the claims. Many alternatives, modifications, and variations will be apparent to those skilled in the art.

What is claimed is:

1. A fluid treatment apparatus, in which when a fluid passes through an electrode made of a metal having an electromotive force, a forward reaction rate of water or fuel is reduced by reduction potential using a potential difference generated in a contacting course of the electrode and the fluid, the fluid treatment apparatus comprising:
   a housing having an inlet port and an outlet port for the fluid at both ends of the housing; and
   a plurality of first electrodes installed in the housing for generating a potential difference through delivery of electrons at a contact surface between the fluid and each electrode, wherein each first electrode is formed in a disc shape and has a fluid passing hole formed in a center portion, said plurality of first electrodes being arranged in parallel in a direction perpendicular to a main flow direction of the fluid so as to form channels between the first electrodes to branch and guide a main flow;
   wherein the main flow is branched by the channels formed between the first disc-shaped electrodes arranged in parallel, and the branched flow is collected at the fluid passing hole and then is discharged from the outlet port.

2. The fluid treatment apparatus as claimed in claim 1, in which the first electrodes are electrically connected to the housing by means of a lead wire to generate negative electricity on a pipe for the main flow connected to the outlet port.

3. The fluid treatment apparatus as claimed in claim 1, further comprising a distributing member positioned in front of a frontmost first electrode for distributing the fluid coming in through the inlet port.

4. The fluid treatment apparatus as claimed in claim 1, further comprising a second pipe-shaped electrode interposed between the housing and the first electrodes.

5. The fluid treatment apparatus as claimed in claim 1, further comprising a spacing member interposed between the first electrodes.

6. A fluid treatment apparatus, in which when a fluid passes through an electrode made of a metal having an electromotive force, a forward reaction rate of water or fuel is reduced by reduction potential using a potential difference generated in a contacting course of the electrode and the fluid, the fluid treatment apparatus comprising:
   a housing having an inlet port and an outlet port for the fluid at both ends of the housing;
   a plurality of first electrodes installed in the housing for generating a potential difference through delivery of electrons at a contact surface between the fluid and the electrodes, in which each first electrode is formed in a disc shape and has a fluid passing hole formed in a center portion, the plurality of first electrodes being arranged in parallel in a direction perpendicular to a main flow direction of the fluid so as to form channels between the first electrodes to branch and guide a main flow; and
   a lead wire for electrically connecting the first electrodes with the housing to generate negative electricity on a pipe for the main flow connected to the outlet port;
   wherein the main flow is branched by the channels formed between the first disc-shaped electrodes arranged in parallel, and the branched flow is collected at the fluid passing hole and then is discharged from the outlet port.

7. The fluid treatment apparatus as claimed in claim 6, further comprising a distributing member positioned in front of a frontmost first electrode for distributing the fluid coming in through the inlet port.

8. The fluid treatment apparatus as claimed in claim 6, further comprising a second pipe-shaped electrode interposed between the housing and the first electrodes.

9. The fluid treatment apparatus as claimed in claim 6, further comprising a spacing member interposed between the first electrodes.

10. The fluid treatment apparatus as claimed in claim 7, further comprising a second pipe-shaped electrode interposed between the housing and the first electrodes.

* * * * *